US009125019B1

(12) United States Patent
Heikkila et al.

(10) Patent No.: US 9,125,019 B1
(45) Date of Patent: Sep. 1, 2015

(54) POSITIONING ARRANGEMENT, METHOD, MOBILE DEVICE AND COMPUTER PROGRAM

(71) Applicant: GloPos FZC, Dubai (AE)

(72) Inventors: Timo Heikkila, Hyvinkaa (FI); Mikael Vainio, Dubai (AE)

(73) Assignee: GLOPOS FZC, Dubai (AE)

( * ) Notice: Subject to any disclaimer, the term of this patent is extended or adjusted under 35 U.S.C. 154(b) by 0 days.

(21) Appl. No.: 14/266,876

(22) Filed: May 1, 2014

(51) Int. Cl.
*H04W 24/00* (2009.01)
*H04W 4/02* (2009.01)
*G01S 19/13* (2010.01)

(52) U.S. Cl.
CPC .............. *H04W 4/023* (2013.01); *G01S 19/13* (2013.01); *H04W 4/021* (2013.01); *H04W 4/027* (2013.01); *H04W 4/028* (2013.01)

(58) Field of Classification Search
CPC .. H04W 64/00; H04W 4/02; H04L 29/08657; G01C 21/26
USPC .......... 455/457, 456.5, 456.1, 456.6; 701/410
See application file for complete search history.

(56) References Cited

U.S. PATENT DOCUMENTS

| 7,199,754 | B2 * | 4/2007 | Krumm et al. ................ 342/451 |
| 2012/0115505 | A1 * | 5/2012 | Miyake et al. ............. 455/456.1 |
| 2012/0200430 | A1 * | 8/2012 | Spahl ......................... 340/932.2 |
| 2012/0209507 | A1 * | 8/2012 | Serbanescu .................... 701/410 |
| 2013/0079039 | A1 * | 3/2013 | Heikkilae et al. .......... 455/456.6 |
| 2013/0183999 | A1 * | 7/2013 | Jovicic et al. ............. 455/456.1 |
| 2014/0031068 | A1 * | 1/2014 | Yamada et al. ............ 455/456.3 |
| 2014/0169187 | A1 * | 6/2014 | Jenkins et al. ................ 370/252 |
| 2015/0065173 | A1 * | 3/2015 | Pliner ........................ 455/456.3 |

* cited by examiner

*Primary Examiner* — Danh Le
(74) *Attorney, Agent, or Firm* — Young & Thompson

(57) ABSTRACT

Electronic arrangement for positioning a mobile device, including a mapping entity configured to obtain positioning data, from a plurality of measuring mobile devices present in an area of interest, establish and maintain, based on the obtained data, a multi-level probability map model structure for the area, wherein each higher level covers the area with lower spatial resolution by a plurality of determine sub-areas, each having a unitary character, and each lower level correspondingly covers, for each the sub-area of the adjacent upper level, a plurality of determined sub-areas thereof with higher spatial resolution, the lowest level determining the highest spatial resolution location elements of the model, optionally coordinates, a locating entity configured to obtain data provided by the mobile device, determine an estimate of the position of the mobile device by traversing through at least a portion of a number of vertical candidate paths of the multi-level probability model structure.

27 Claims, 4 Drawing Sheets

POSITIONING ARRANGEMENT, METHOD, MOBILE DEVICE AND COMPUTER PROGRAM

TECHNICAL FIELD OF THE INVENTION

This invention relates generally to determining the location of a mobile device comprising mobile positioning or positioning-enabling technology. More particularly the invention relates to solutions for accurately determining the location of the mobile device in which the location positioning is refined by environment data received through wireless cellular communication network and optionally from external databases.

BACKGROUND OF THE INVENTION

Location tracking devices and other such mobile terminals, e.g. smartphones, typically comprise satellite-based location determination functionality, e.g. a receiver for global positioning system (GPS) or GLONASS (Global Navigation Satellite System) and to some extent cellular communication functionality, e.g. transceiver for collecting cellular data from nearby cells/base stations and reporting it to a receiver at the remote location. To determine a location, a GPS receiver must have current almanac data and ephemeris data for at least three appropriate satellites and the receiver must have an initial estimate of its location. However, the reception of signals from the satellites easily suffers from interruptions caused by landscape obstructions such as geographic features, buildings, trees, etc. Because location tracking devices are often operated in environments, such as cities and urban areas, wherein GPS or generally satellite navigation signal reception will be intermittent, this can result in poor performance of the location tracking system.

WO 2010/055192 discloses a method and system for positioning with enhanced accuracy. The suggested solution yields excellent results based on first collecting, from a number of terminals devices, positioning data such as GPS data and environment data including e.g. cell data during a modelling phase to determine covered area estimates of cell network base stations, whereupon during a positioning phase the mere environment data suffices for accurate positioning due to the available covered area estimates with various supplementary data.

In US 2013/00879039, the solution of '192 is developed further by adding vertical information to the position estimates to obtain true 3d positioning.

Notwithstanding the numerous improvements the '192 and '039 clearly introduce to the prior art, the associated solutions may still be optimized having regard to a number of factors and different possible use scenarios.

Depending on the capabilities of the entity executing at least part of the modelling or positioning calculation and associated data transfer procedures, the load caused by such procedures is, if not excessive having regard to the properties of the concerned device(s), nevertheless never a benefit, when the data transfer and data processing capacities are somehow limited, which is often the case especially with mobile devices. With genuine mobile devices such as smartphones or phablets having no power cords connected thereto most of the time, the above factors are also emphasized by the relatively modest power capacity the contemporary batteries are able to offer. Yet, various calculations upon positioning tend to add to the processing, and therefore indirectly, to the positioning delay.

Yet, as the information available about the environment of an object, such as a mobile phone, to be tracked becomes all the time more versatile due to the emerge of new communications technologies such as 4G/LTE (Long-Term Evolution), also new possibilities may arise to extend the data input space, whereupon concentrating the positioning efforts around any certain type of data source or a related model may not give optimum results during real-time positioning, when a variety of data sources in terms of different network signals, etc. are however available and detectable by the object to be positioned.

SUMMARY

The objective of the present invention is to cultivate the previously disclosed solutions further from the standpoint of the above considerations.

In one aspect of the present invention, an electronic arrangement, or system, for positioning a mobile device, comprises
  a modeling entity configured to, in order to construct a
    database for locating mobile devices,
obtain positioning data, such as satellite positioning data, and environment data, such as cellular network based data, from a plurality of measuring mobile devices present in an area of interest,
establish and maintain, based on the obtained data, a multi-level probability map model structure for the area of interest, wherein each higher level covers the area of interest with lower spatial resolution by a plurality of determined sub-areas, each sub-area having a unitary character in terms of the obtained data and/or features derived therefrom, and each lower level correspondingly covers, for each said sub-area of the adjacent upper level, a plurality of determined sub-areas thereof with higher spatial resolution, the lowest level determining the highest spatial resolution location elements of the model, optionally coordinates, and
  a locating entity configured to, in order to locate a mobile
    device,
obtain at least environment data and optionally positioning data provided by the mobile device,
determine an estimate of the position of the mobile device by traversing through at least a portion of a number of vertical candidate paths of the multi-level probability map model structure starting from a number of candidate sub-areas in the highest level, the candidate sub-areas being selected and paths continued or terminated on each level based on determining the probability of the mobile device residing in each sub-area in view of the obtained environment data and optional positioning data and characteristics of the sub-area, until the lowest level with highest spatial resolution is reached, wherein the position estimate of the mobile device is determined based on the highest probability location elements thereof according to predefined criteria.

In one embodiment, the environment data comprises at least one data element selected from the group consisting of: cellular network data element, wireless LAN (local area network) data element, MCC (mobile country code) identifier, MNC (mobile network code) identifier, primary scrambling code, ARFCN (absolute radio-frequency channel number), BSIC (base station identity code), received signal strength, radio frequency, LAC (location area code), TAC (tracking area code), CID (Cell ID), PCI (Physical Cell ID), MAC (media access control address), SSID (service set identifier), RSSI (received signal strength indication), RSCP (received signal code power), and RSRP (reference signal received power).

In another embodiment, data elements are obtained, analysed, and/or stored as grouped according to predefined logic.

Grouping may be executed to temporally equivalent (substantially regarding same time instant) and/or sequential data. Optionally, e.g. multiple cell data may be grouped. For instance, indication of current serving cell and neighbour cells, or related data, may be grouped. Such grouping is logical as also in real-life there typically are several cells visible for a mobile device at a given instant and their mutual existence is not random-like or unlimited as physical positioning of the base stations etc. rather effectively define and limit the possible combinations of cells that may be simultaneously visible for a mobile device at certain location or certain area. Common parameter(s) such as average(s) may be determined from the grouped data for use in positioning.

In a further embodiment, grouping is utilized in defining probabilities for different locations such that probability of a certain location is affected by the probabilities of surrounding locations or areas, the effect of the probability of surrounding location or area to the certain location decreasing with distance from the certain location. Accordingly, the probability of a location is determined by a greater area incorporating the location, which also facilitates determining probabilities for uncharted locations wherefrom explicit mapping data for use by the modeling entity has not been received.

In a further embodiment, the probability map model structure is constructed from environmental data based on a plurality of technologies, e.g. cellular data and WLAN data. As the technologies differ as to the available data elements and element inter-dependencies, at least part of the processing may be conducted technology-wise. Subsequently, the information provided by the multiple technologies, or initially technology-specific probability maps, which may be geographically overlapping, may be merged together in accordance with predefined merging logic to establish a common probability map.

In a further embodiment, the modeling entity is configured to (pre-)calculate predefined statistics to be applied, preferably substantially in real-time fashion, by the locating entity with environment data to determine the probabilities in the probability model structure for the ongoing positioning task concerning the mobile device.

Optionally, the statistics may include cell-based statistics, such as indication of relative cell visibility within an area.

In a further embodiment, the modeling entity is configured to, based on the obtained positioning data and environment data, optionally cell data, to update the probability map model structure. It may determine whether the obtained data regarding a plurality of locations indicates an area that contains unitary character according to the criteria utilized, and if this is the case, to model the area as a sub-area of a level of the model structure. The unitary character may refer to common or similar features, or features following a common logic, e.g. following a common equation. For instance, signal strength of a communications network, optionally cellular network, may be, within an area, modeled with a common equation provided that there are no elements causing surprising discontinuities thereto. Accordingly, the originally blank areas for which direct measurement data (positioning/environment data samples) have not been received, may still be modeled by the available samples regarding adjacent or surrounding locations.

Optionally, areas such as sub-areas and/or areas outside them may be determined using a bounding box methodology. Obtained data points relative to physical locations may be utilized to define a number of bounding boxes ('empty' areas) around or between the points. Upon receipt of further data points, the existing bounding boxes may be further split. Characteristics, e.g. signal strength, may be modeled within a bounding box through adjusting the borders of the box so as to cover some obtained data points (measurements) and determining the characteristics within the box by a selected estimation technique and logic fitting the border area measurements to the model.

In a further embodiment, multiple competing or parallel models are at least temporarily established for an area, such as sub-area. Instead of complete geographical correspondence, the models may be just partially overlapping.

Based on detecting a large enough, according to predefined criteria, change or temporal discontinuity in the characteristics indicated by the obtained more recent data relative to an area, such as a change in signal strength, in view of the model based on earlier data, a revised model following the more recent data is created alongside with the previous model to compete therewith.

Both the models may be updated until the model considered inferior according to decision-making criteria optionally putting emphasis on the more recent data is discarded and the remaining model will remain as the sole model at least until the next major change. In case the detected change was permanent, the newer model will remain while the previous is discarded.

Network conditions regarding e.g. wireless networks may abruptly change either permanently or temporarily. For example, new base stations may be set up, old one(s) ramped down, configuration changed, objects such as buildings affecting the radio path on the area are built or torn down, the amount of wireless traffic considerably increases or decreases (could take place when e.g. a new business center is opened or some existing hotspot is closed down). Parallel models may be established to describe the fluctuation taking place in the network(s) and related wireless environment that spans the concerned area(s).

In a further embodiment, the area-based, such as sub-area based, models are time-sensitive. The model may exhibit the temporal, optionally regular, fluctuation of area-related characteristics. For example, daily traffic, working hours, etc. may all affect the wireless environment, e.g. signal-to-noise ratio, in terms of the amount and/or type of wireless signal transmissions, whereupon the area-related characteristics implied by the model may be highly time-sensitive and preferably also modeled responsive thereto. Time-sensitivity may be provided on different resolution depending on the embodiment. It could be hour, time-of-day, week, or month-based, for instance. Depending on the time of positioning and related data obtained, the corresponding model information such as parameters may be applied for the determination of the position estimate.

In a further embodiment, the probability map based model representing a certain time instant or time span, is merged with a previous probability map based model, or at least related previous data, so as to integrate historical position transition probability thereto.

The locating entity may be configured to optionally substantially continuously, periodically or intermittently determine by the previous data the most probable path of movement leading to an associated most probable current location.

Optionally, the movement estimation and temporal analysis takes available additional supportive information into account while determining the related probabilities. If the area under analysis generally classifies as 'motorway', relatively rapid movement between successive positioning points is possible and even likely, which may be adopted by the positioning logic to enable weighting or otherwise adjusting the probabilities. Staying at one location from a measurement to another at such area is unlikely, unless there's gas station in the neighborhood, roadwork going on, etc. In contrast, a local road with low speed limit and several near-by traffic lights implies (typically) relatively modest transitions. The same generally applies to indoor locations and e.g. promenades, wherein, besides low speed transitions, the mobile devices may actually remain stationary and fast transitions are very unlikely.

Optionally, a predefined estimation algorithm is applied to predict the likely path and current or future position of the mobile device based on determining probabilities for a number of paths of the mobile device based on current and historical environment data. Optionally Kalman filter is utilized.

In a further embodiment, data obtained from a second mobile device is utilized in positioning the first mobile device during positioning. As several mobile devices may populate the area of interest substantially simultaneously, each of them may provide the positioning arrangement with data also useful in locating other device(s). Data from several mobile devices may be thus jointly utilized in positioning the first device. Especially, data received from the second mobile device may be utilized to alter the location probabilities of the first mobile device.

In a further embodiment, differences between the reception characteristics of mobile devices may be compensated through an offset matching procedure. Environment and optionally positioning data provided by a mobile device may be fit to the probability model utilizing a plurality of candidate offsets (e.g. offset factors, adaptation formulae, etc.) to determine the proper offset, or scaling, for the data in view of data correspondence and comparison. The offset matching may incorporate temporal aspect, i.e. movement path estimates instead of fitting individual points may be applied in offset matching.

In a further embodiment, data sources are logged and reliability estimates are calculated optionally for each collected sample. Reliability can be determined, for example, based on the source (e.g. professional vs crowd sourced, GNSS vs manual), estimated GNSS accuracy (e.g. estimate given by a GPS (Global Positioning System) receiver), comparison to external maps, continuity of movement in continuous mapping (physical impossibilities or highly improbable changes in position), etc. Subsequently, data with considered higher reliability may be given more weight in modeling and/or positioning than data with considered lower reliability.

In a further embodiment, a mobile device may provide besides wireless environment data such as cell information, also absolute or relative time information and/or additional information ranging from sensor data (accelerometer, gyroscope, compass, air pressure, humidity, temperature) to optionally user specified location and/or related contextual information (walking, driving, floor information, etc.) to assist in locating the device. The contextual information may be obtained based on the sensor data. Optionally, e.g. camera images or sound data (microphone signal, etc.) may be obtained by the mobile device and analyzed locally or remotely by means of pattern recognition technique(s) for the determination of locationcontext or activity-context data for positioning purposes in addition to potential other uses.

In a further embodiment, supportive information, such as contextual information, characterizing the area of interest and sub-areas thereof may be obtained from a number of sources besides mobile devices. Network operator(s) may provide information regarding their network configuration, such as location of cell towers (base stations), used channels and transmission parameters (signal strengths, etc.). Cartographers, surveyors, officials, construction companies, private citizens may provide info all alike via their (e-)services or databases. A data source may be associated with a certain level of trust, which is then applied in adopting or utilizing the information during modeling or positioning as an emphasis factor, for instance.

The information may describe the area demographics/population, geographical nature or topology of areas (e.g. urban, sub-urban, countryside, forest, park, industrial, field/farm/agriculture, seaside, mountainous, hilly, valley, etc.) and/or of associated objects (dimensions, concentration, etc.), such as buildings and other infrastructure like blocks, bridges, dams, ports, etc., in the area. Movement-related data such as applicable speed limits, traffic status (jammed/clear, etc.), roads, road types (motorway etc.), pavements, cycleways, traffic lights (status, location), etc. may be indicated. The system may be configured to apply the obtained supportive mapping information to revise probabilities and/or other area-characteristic features of the probability map model structure according to a selected logic. For instance, information regarding the type and constitution of an area may affect the signal model (e.g. propagation, attenuation or strength model) generally applied for the area. Area with higher concentration of artificial infrastructure such as buildings may be allocated with more radical signal attenuation characteristics, and vice versa, for example.

In another aspect, a method for positioning a mobile device operable in at least one wireless communications network, comprising obtaining positioning data, such as satellite positioning data, and environment data, such as cellular network based data, from a plurality of measuring mobile devices present in an area of interest, establishing, based on the obtained data, a multi-level probability map model structure for the area of interest, wherein each higher level covers the area of interest with lower spatial resolution by a plurality of determined sub-areas, each sub-area having a unitary character in terms of the obtained data and/or features derived therefrom, and each lower level correspondingly covers, for each said sub-area of the adjacent upper level, a plurality of determined sub-areas thereof with higher spatial resolution, the lowest level determining the highest spatial resolution location elements of the model, optionally coordinates, and generating a location estimate of the mobile device, wherein at least environment data and optionally positioning data are provided by the mobile device and an estimate of the position of the mobile device is determined by traversing through at least a portion of a number of vertical candidate paths of the multi-level probability map model structure starting from a number of candidate sub-areas in the highest level, the candidate sub-areas being selected and paths continued or terminated on each level based on determining the probability of the mobile device residing in each sub-area in view of the obtained environment data and optional positioning data and characteristics of the sub-area, until the lowest level with highest spatial resolution is reached, wherein the position estimate of the mobile device is determined based on the highest probability location elements thereof according to predefined criteria.

In a further aspect, a mobile electronic device operable in at least one wireless communications network, is configured to obtain a multi-level probability map model structure for an area of interest, wherein each higher level covers the area of interest with lower spatial resolution by a plurality of determined sub-areas, each sub-area having a unitary character in terms of the obtained data and/or features derived therefrom, and each lower level correspondingly covers, for each said sub-area of the adjacent upper level, a plurality of determined sub-areas thereof with higher spatial resolution, the lowest level determining the highest spatial resolution location elements of the model, optionally coordinates, the model structure being established based on positioning data and environment data from a plurality of measuring mobile devices present in the area of interest, obtain environment data based on a number of captured wireless network signals, and estimate its position through utilization of the model structure, wherein the position is determined by traversing through at least a portion of a number of vertical candidate paths of the multi-level probability map model structure starting from a number of candidate sub-areas in the highest level, the candidate sub-areas being selected and paths continued or terminated on each level based on determining the probability of the mobile device residing in each sub-area in view of the obtained environment data and characteristics of the sub-area, until the lowest level with highest spatial resolution is reached, wherein the position estimate of the mobile device is determined based on the highest probability location elements thereof according to predefined criteria.

The previously presented considerations concerning the various embodiments of the system may be flexibly applied to the embodiments of the method and mobile device mutatis mutandis and vice versa as being appreciated by a skilled person.

Yet, there may be provided a computer program product embodied in a non-transitory carrier medium, comprising computer instructions causing the computer to perform any steps of the method.

The utility of various embodiments of the present invention arises from a variety of issues depending on each particular embodiment in question as being clear to a skilled person on the basis of the foregoing. When the amount of mapping and related mapping (measurement) data varies greatly within nearby areas, traditional 'fingerprinting' based technologies are much more likely to find location matches within the areas of higher mapping volume due to the unstable nature of signal measurements. In contrast, the probability map based approach suggested herein can eliminate or minimize this problem by using a wider amount of data and statistical analysis to determine the possibility of certain measurements occurring in a certain place rather than depending on actually having observed the exact readings there or automatically opting for the exact readings already observed in another location of otherwise much lower probability when all relevant factors are considered. Probabilistic approach in modelling and positioning is rather insensitive to real-life oddities, disturbances and inaccuracies of the underlying systems and executed processes. The approach is generally suitable to a myriad of wireless technologies and mobile devices including 4G and related technologies such as the LTE.

Yet, multi-level multi-resolution probability map model structure enables substantially real-time positioning of mobile devices with reduced computational cost. Multiple candidate locations may be first roughly estimated with a coarser spatial (geographical) resolution and then analysed further on different model levels until the criteria for discarding the candidate position is fulfilled or the lowest level/the level of highest spatial resolution is reached.

The utilized positioning technique takes history data (data previously collected regarding the device to be positioned) into account in estimating likely current and future locations and associated paths. Yet, temporal differences between signal path characteristics may be acknowledged and utilized in position with timedependent models, for example.

Changes detected in the wireless environment are detected, monitored, and analyzed in the light of the models and revisioning thereof.

Further, mutually different reception or processing capabilities of the mobile devices are compensated by the off-set matching of data.

Various embodiments of the present invention together with additional objects and different advantages will be best understood from the following more detailed description of specific embodiments when read in connection with the accompanying drawings.

The embodiments of the invention presented in this document are not to be interpreted to pose limitations to the applicability of the appended claims. The verb "comprise" or any other variation thereof is used in this document as an open limitation that does not exclude the existence of also unrecited features. The features recited in depending claims are mutually freely combinable unless otherwise explicitly stated. The terms "a", "an" and "at least one", as used herein, are defined as one or more than one. The term "plurality", as used herein, is defined as two or more than two. The term "number" basically refers herein to any positive integer, such as one, two, or three. The terms "including" and "having", as used herein, are defined as comprising. The term "another", as used herein, is defined as at least a second or more. The terms "program", "computer program" and "computer instructions", as used herein, are defined as a sequence of instructions designed for execution on a processor.

BRIEF DESCRIPTION OF THE DRAWINGS

Hereinafter various embodiments of the present invention will be described in more detail with reference to the accompanying drawings, in which.

DETAILED DESCRIPTION OF THE INVENTION

Figure 1:
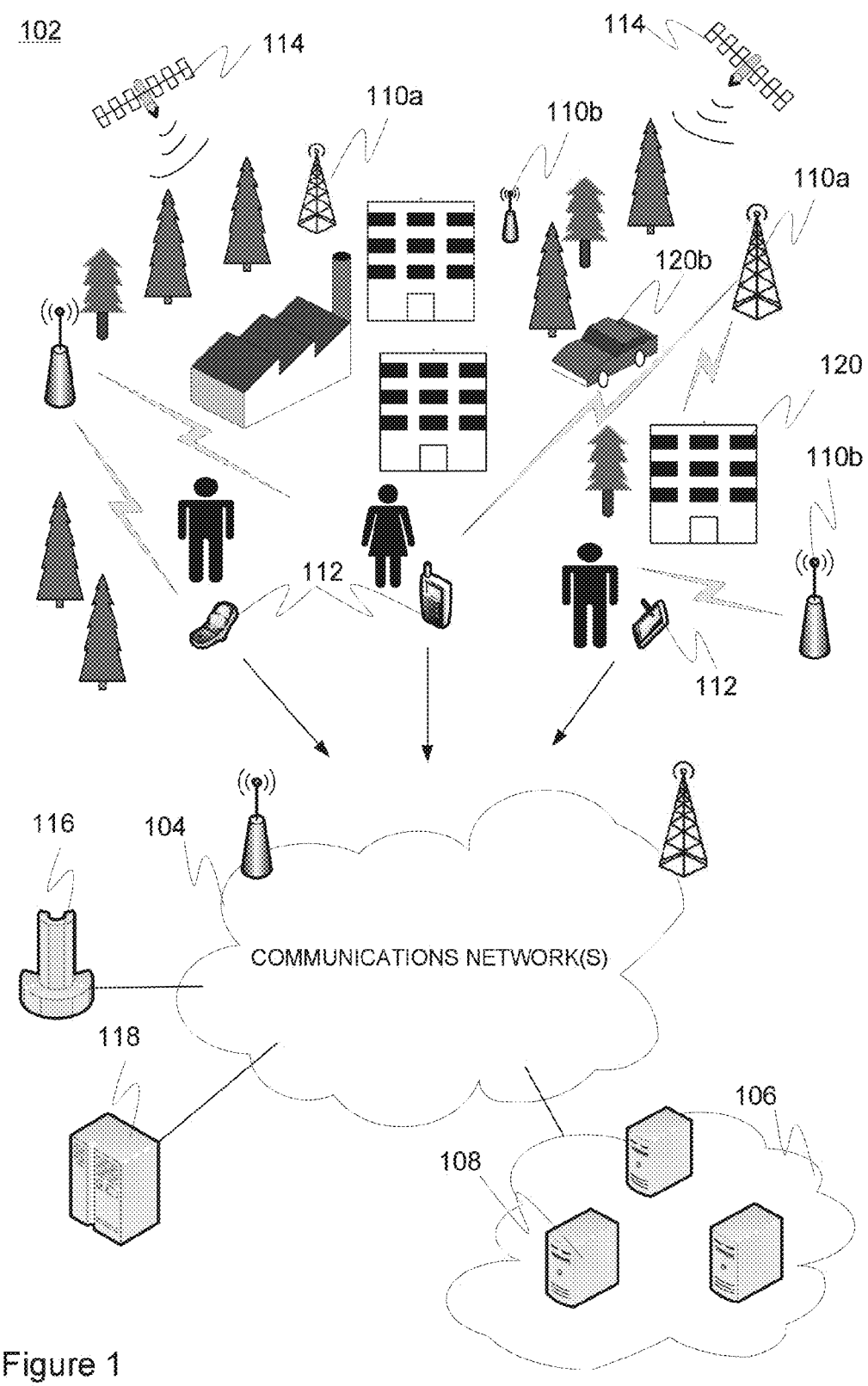
FIG. 1 illustrates one basic use scenario of an embodiment in accordance with the present invention.

FIG. 1 illustrates, at 102, an embodiment of the present invention via a merely exemplary use scenario thereof.

The positioning system 106 may be at least partly located in a number of servers 108 residing as accessible via communications network(s) 104 such as the Internet and/or cellular network(s). Optionally, a cloud computing environment providing efficient and easy scalability of resources may be utilized to implement the system 106. In some other embodiments, the mobile devices to be positioned may be self-contained in a sense that they may locally execute a positioning method in accordance with the present invention preferably even if no Internet connection exists. In some further embodiments, the mobile devices may be positioned by the (network) arrangement through utilization of information the mobile devices provide to the network in any case, i.e. the mobile devices are not specifically arranged to provide information to the network especially for the positioning as they are, depending on the used wireless technology, reporting data to the network e.g. periodically to enable remaining registered therein, for example, whereupon the same data may suffice also for positioning purposes in accordance with the present invention. This approach may find particular use in connection with emergency situations such as emergency, or '911', calls and finding of missing persons.

Indeed, the system 106 is configured to position mobile devices 112 such as wireless terminal devices, nowadays most typically smartphones, tablets, phablets, laptop computers, etc. carried along by/in the possession of their users in an area of interest. Thus, the system 106 may be considered as being capable of positioning associated users as well. Basically the overall area of interest may be global, regional, or local in terms of size thereof, and be divided to a number of sub-areas for the calculations as explained herein throughout the text. The area(s) may incorporate different topography with natural and artificial features such as buildings 120 as shown in the figure that may affect the environment data sensed by the mobile devices 112. Yet, the area may incorporate more dynamic or essentially temporary objects such as vehicles 120b.

The mobile devices 112 may be connected to a number of wireless networks and components of related infrastructure at a time. Through such network connections, also the system 106 may receive various data such as environment or positioning data from the devices 112. The components may include base stations 110a of cellular networks and access points 110b of wireless LAN networks, for instance.

Yet, the mobile devices 112 may be capable of receiving explicit positioning data from an external source such as a satellite 114, which may refer to a GNSS (Global Navigation Satellite System) such as GPS or GLONASS, or some geographically more limited alternative.

During the mapping or measurement operations, which are aimed for modelling purposes and establishing at least initial probability map based model structure, it is preferred that the mobile devices 112 providing data for the purpose are capable of receiving and forwarding positioning data as well as environment data, such as data indicative of detected cellular or other wireless networks, whereas during the actual positioning phase it is expected the mobile devices 112 to be positioned do not necessarily obtain any such positioning data, but solely environment data instead. External sources, technically often embodied as servers or related services, 116, 118 may further provide data to cultivate modelling and/or positioning activities. The sources 116, 118 may provide wireless network operation or configuration related information (e.g. cell tower location or configuration data), network or road traffic information, event information, geographical information, demographic information, etc.

The data provided by mobile devices 102, external sources 116, 118, and other entities can be stored as raw data and/or as physical area defined groups with reference to the aforementioned sub-areas specifying, for example, signal strength averages, relative and absolute weights of cell identifiers or signal strength, signal ranges, etc.

Multiple wireless communication technologies, or data from such, are advantageously cooperatively applied during modelling and/or positioning. Several different technologies may be applied substantially simultaneously, alternately, etc.

Data relating to each technology may still be partly independently analysed and related technology-specific models established, but at least the final decision-making shall combine information arisen from each available technologydependent analysis. In that sense, hybrid modelling and positioning takes place. Accordingly, even if technology-specific data and models are exploited, care is taken to ensure the final mutual compatibility thereof by a predefined merging logic.

Few examples of generally applicable wireless technologies include 2G, GSM, 3G, 4G, LTE, WCDMA and WiFi-based technologies, for instance. Dedicated (sub)models with different parameters and/or determination logic may be constructed for different technologies during the modelling phase, but at least during positioning the technology-specific considerations are ultimately combined to obtain a common estimate for the location of the mobile device.

Data such as environment data useful for positioning a mobile device may be provided e.g. in Network Measurement Reports (NMR) to the positioning system 106.

The data may identify a serving cell and/or a number of neighbouring cells relative to the mobile device, for instance. The data may include at least one element selected from the group consisting of: MCC (Mobile Country Code), MNC (Mobile Network Code), LAC (Location Area Code), TAC (Tracking Area Code, available in 4G LTE, identifying a tracking area within a particular network thereby reminding of LAC in 2G/3G) CID (Cell ID), PCI (Physical Cell ID, available in 4G/LTE), ARFCN (Absolute Radio-Frequency Channel Number), BSIC (Base Station Identity Code), CPICH (Common Pilot Channel), MAC (Media Access Control, MAC address) and RSSI (received signal strength indication). Preferably, however, the data includes several aforementioned elements. Substantially transparent operator-end positioning may be realized as the report data may be anyhow transmitted from the mobile device(s) to the network, depending on the system.

With particular reference to cell data, cell data may be stored with operator (MCC & MNC) identifiers and e.g. Primary Scrambling Code (WCDMA)/ARFCN+BSIC (GSM) or other stable identifier(s). Received signal strength is also beneficial parameter for obtaining good positioning accuracy, though not absolutely necessary. Radio frequency data (from ARFCN/UARFCN) can be used to improve positioning. Identifiers such as LAC and CID are stored where available and are helpful especially for acquiring the first fix, but not necessary. Mobile devices may be configured to monitor e.g. various control channels in order to obtain cell data for positioning in congruence with the present invention, or data applicable for determining it.

Further, in connection with 3G, e.g. UMTS/WCDMA, RSCP (received signal code power) or data derived using it may be applied for modelling/positioning purposes. RSCP indicates the power measured by a receiver on a particular physical communication channel. It is used as an indication of signal strength at the current position of the mobile device, which may be used in estimating the location itself.

Yet, particularly in connection with 4G/LTE, e.g. RSRP (reference signal received power) or data derived using it may be monitored for modelling/positioning purposes. RSRP indicates linear average power of the downlink reference signals (RS) across the whole channel bandwidth for the resource elements (RE, smallest basic element in data transfer on physical layer having regard to time and frequency) that carry cell specific reference signals. RSRP thus reflects the strength of cells at a current position of the mobile device.

Many aforementioned data elements, e.g. RSCP and RSRP, are readily available in the mobile devices and in any case determined by component(s) therein, e.g. by a baseband processor or 'baseband chip', whereupon their further utilization does not really require heavy additional processing.

The obtained data, particularly e.g. cell data, may be analyzed, modeled and applied in positioning as combinatory entities, i.e. in combination with other similar entities, when applicable. Probabilities of different combinations may be modeled and calculated. For instance, with cellular networks only certain limited combinations of cells can be visible to a mobile device at a time due to the limited coverage of a single cell and relatively static configuration and allocation of cell towers within an area. Therefore, combined processing may add to the reliability of the modeling and positioning results.

For Wi-fi, MAC is one piece of preferred information. This can be associated with cell data where available to distinguish e.g. globally overlapping MAC's. E.g. SSID names can also aid in this. Radio frequency is not needed, but can be used as an additional parameter. Recording time is preferably included in or associated with the log entries of the gathered database for the system to stay up to date and able to renew itself.

During modeling, measurement data including positioning data (e.g. GPS) and associated (wireless) environment data, optionally cellular data, is obtained. Different statistics, part of which are technology-specific, may be then (pre)calculated for subsequent use in connection with positioning tasks. For instance, for a position the occurrence probabilities of different cell signal strengths may be determined.

While data is gathered, also areas remaining outside the locations indicated by the measurement data may be identified. As mentioned hereinbefore, a so-called bounding box technique may be utilized to model the area limits. Based on (measurement) data samples defining at least part of the border regions of the bounding boxes, internal models for the boxed unmapped or 'blank' areas may still be determined. Such models may apply selected extrapolation and interpolation methods to stretch the extent of available data to the otherwise blank regions.

The so-established probability models later accept e.g. measurement data or data derived therefrom, e.g. cell signal strength, as input, and provide related location probabilities, the location with maximum probability, as output. Several models may be run in parallel and/or in series as being clear on the basis of the current description.

Besides considering greater areas instead of/in addition isolated locations, or location points, in the overall area of interest, the embodiments of the present invention preferably utilize, for the determination of the current location, also previous data in addition to the latest environment data provided by the mobile device. Therefore, data combining and aggregation takes places both in geographical and temporal sense. Current and previous location candidates may be utilized in calculating path probabilities leading at the current location candidates with maximum probability.

The paths analyzed may be filtered to smoothen out the potentially abrupt transitions therein. Kalman filtering may be applied to estimate the movement and likelihood of features thereof (turns, going straight, etc.). Movement estimation results may be used for weighting the location probabilities. When such estimation procedure is applied together with other information known concerning the area in question, e.g. the locations of objects such as buildings, roads, or various obstacles, location probabilities may be further weighted.

If additional data such as sensor data indicative of movement information (e.g. acceleration, speed) is obtained, such additional data may be further harnessed to cultivate the probabilities. Movement of a mobile device has to follow the laws of physics (certain sensible limits for speeds, accelerations, changes in the rate of turn, heading, etc. can be defined), whereupon also at least relatively reliable movement indications shall be utilized to weight the probabilities accordingly. Of course, even without any explicit movement sensor data or similar input, general guidelines may be limited for maximum speed, for instance, in each contemplated area. For example, if the area type is urban or urban downtown, it is highly unlikely, practically impossible, that speeds in the order of magnitude of e.g. 200 km/h+ or related transitions do really occur.

Also specific time of day, week, month or year may be acknowledged in the analysis. E.g. wireless environment or traffic conditions (speed limits, etc.) may change accordingly, which may be statistically modeled and taken into account in positioning.

From the standpoint of the present invention, modeling the area in question may be repetitive, iterative background process that is executed when new measurement data such as positioning and environment data is available. Accordingly, as the wireless environment in the area may sometimes considerably evolve over time due to various changes in the network configuration, traffic conditions, grid plan, etc., such major changes may be reflected by the data, and be tracked and detected by the present invention according to predefined logic.

Occasionally, major changes noticed are due to errors in mapping or indicative of just temporary change or daily fluctuation. Even climatic conditions may occasionally seriously affect the measurements.

However, errors in mapping (arising e.g. from the GPS) appear typically in random or semi-random manner. Often these situations can be predicted based on GPS accuracy estimation data indicating bad quality or other factors listed above, and given low priority in positioning, but when such an error goes unnoticed, its effect can often be minimized by its highly improbable association with the surrounding mappings (determined from low weight in comparison to other mappings around it).

No mapping is completely nullified, however, unless clearly erroneous or if there is a high volume of mapping in the area and it clearly doesn't match with the rest. On the other hand, when more recent measurements start to make the previous data look outdated and invalid, the invalid data shall eventually be dropped out.

Permanent-appearing changes may be verified prior to being completely accepted by the system through parallel usage of two or more models regarding the same area and/or related features (e.g. cell signal strengths, timing advances, etc.) that could be considered as competing. The detected instant of a major change in the tracked features may be applied as the creation instant of a new model. When the change seems permanent according to the criterion used, the previous model may be discarded or classified as inactive, and switched over to the new one, also in positioning.

Figure 2:
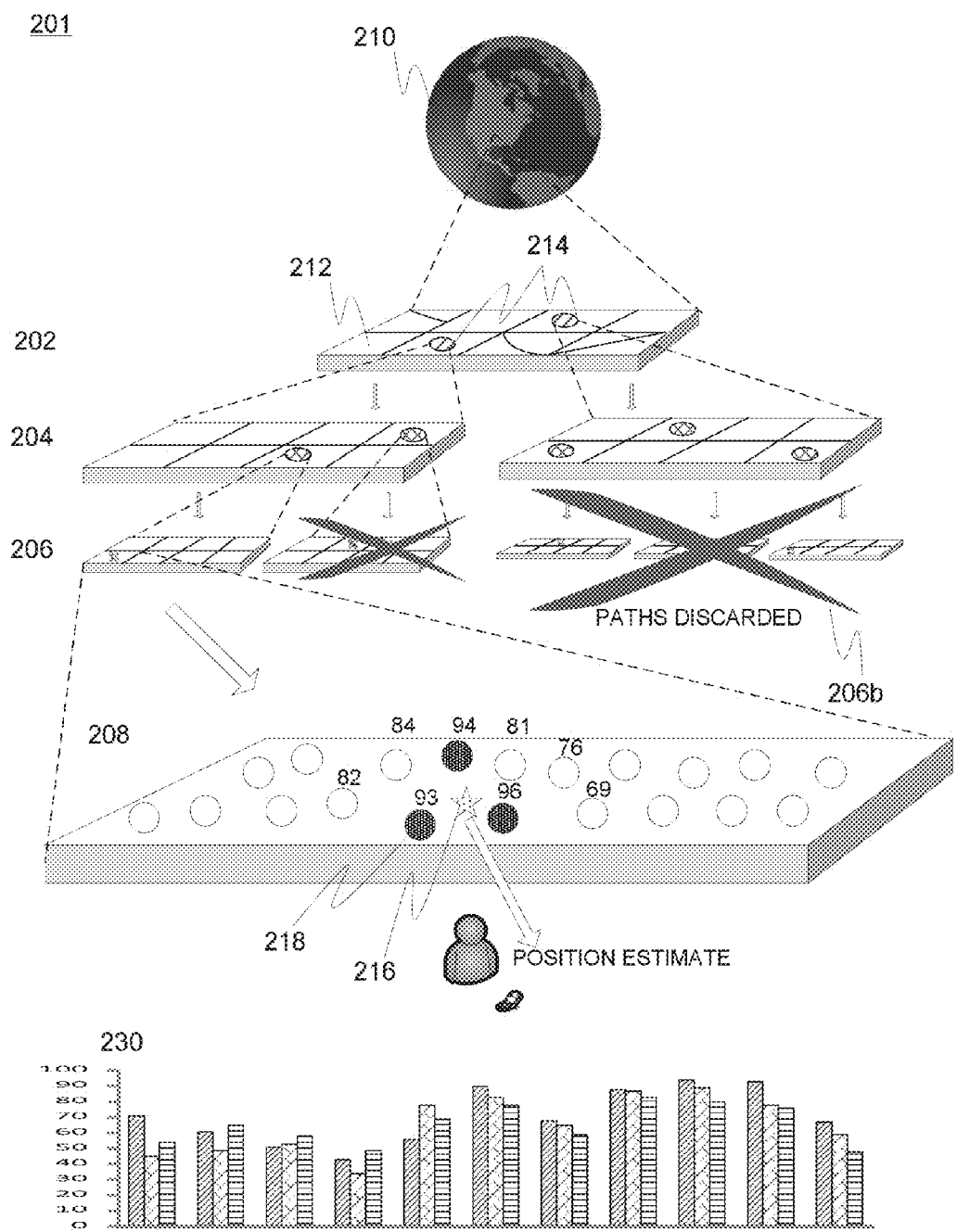
FIG. 2 illustrates an embodiment of a multi-level probability map structure for use with the present invention.

FIG. 2 illustrates, at 201, an embodiment of a multi-level probability map for use with the present invention. The scope can, in theory, be global but also more limited focus, e.g. national or clearly regional focus, is fully applicable geographically.

Indeed, the area of interest 210 has been divided into feature-wise or 'characteristically' internally united sub-areas 212, 214, or 'islets', at several overlapping levels 202, 204, 206 with spatial, or geographical, resolution increasing from the top or surface level towards the bottom.

The shown grid-like structures and rectangular or specifically quadratic area shapes 212, 214 are merely exemplary, and in addition to such regular forms, other shapes could be utilized either exclusively or together with regular forms, when appropriate (i.e. practical in view of the characteristic domains, i.e. data and features, modeled therewith). Sub-areas 214 on one level 202 associated with a coarser spatial resolution may be inspected with higher resolution on the subsequent level 204 where, in turn, the sub-areas 214 are represented by multiple constituent (sub)sub-areas etc. Multiple sub-areas on a certain level may mutually overlap.

Upon modeling, statistics for constituting or populating the multi-level structure are established based on the obtained measurement data including positioning data and temporally substantially corresponding environment data. Different sub-areas within the overall area of interest may be formed by finding unitary characteristics among geographically close data points. Unitary characteristics may refer to similar signal values such as cell signal power or generally similar rules, formulae or logic, e.g. in terms of signal attenuation or generally wireless environment, which the locations in the area seem to follow in respect of the monitored features. Error associated and possibly indicated with positioning data (e.g. GPS error estimate) may further be used to weight or prioritize the corresponding environment data when applied in modeling. Yet data source reliability information may be applied in processing or weighting measurement data. As a concrete example, professionals (e.g. cartographers) with professional gear may provide at least some measurement data, whereupon such data may be deemed more reliable and given more weight than e.g. data from volunteers with ordinary consumer electronics type measurement equipment. Nevertheless, crowdsourcing is one valid option for obtaining large amounts of data with minimal effort.

When the data contains user-inputted (manual) information such as indication of the location (may be free-form text "I'm at the crossroad of West $7^{th}$ Avenue and Bank street" or e.g. coordinates or other more specific location input based on e.g. selection of a location via Google Maps™ or other interactive map feature), less weight/more room for error may be allocated for such location announcement than with machine-determined locations. Between professional and hobby/volunteering mappers, similar weighting may be applied to manually input data.

To position a device, typically a mobile device such as smartphone, tablet, or phablet, through utilization of the model structure and established related statistics, at least a portion of a number of vertical candidate paths of the multi-level probability map model structure are walked through starting from a number of most likely candidate sub-areas in the highest level 202, wherein the candidate sub-areas seem to match best with the environment data provided by the mobile device. As mentioned hereinbefore, also during positioning data provided by other mobile devices may be utilized as well to update the model and related probabilities.

On a next level 204, the most likely candidate (sub)sub-areas are determined and then followed to the subsequent level 206. At any level, some candidate (vertical) paths across the levels may be terminated/discarded 206b when their likelihood as the true location of the mobile device falls or remains below the used threshold criteria. As the analysis resolution increases due to a switch from upper level to a more detailed level and/or more environment data is received from the mobile device, such action could likely take place.

The lowest level 208 with highest spatial resolution is ultimately reached, wherein the final position estimate of the mobile device is determined based on the location(s) with highest probability at that stage based on the contemporary and previously received measurement data including at least environment data and optionally positioning data or additional/supportive data.

In the figure, the probabilities of certain locations 218 are indicated as probability scores (numerical values following a predefined scheme, which may also be the preferred scheme generally used with the model), the higher the score the higher the probability of the mobile device being in at particular location. These certain locations may represent e.g. locations explicitly present in the raw data obtained during modeling, for instance, or areas/locations derived based on the underlying, adjacent, or near-by raw data points. The position estimate 216 outputted may be the best-matching such location, or a location calculated based on the root-level locations by a suitable technology, optionally incorporating interpolation or extrapolation, for example.

At 230, a merely exemplary, illustrative, sketch of a probability (score) distribution of few candidate locations is shown relative to three time instants (bars with different patterns).

The multi-level hierarchy 201 is in many ways advantageous approach for positioning. On a higher level, rough estimates of potential locations may be rapidly and efficiently, in terms of dynamic data transfer, processing and memory requirements, determined and most of the (sub-) areas likely somewhat immediately discarded while proceeding deeper into the model structure with more detailed look at the remaining options.

However, a skilled person will appreciate the fact that even if some alternative model structure, optionally implementing a single-level approach only, was ultimately selected for the target use scenario instead of the multi-level structure described in detail herein, most of the remaining advantageous features and principles of the present invention could be still be utilized, including sub-areas in the model, and regarding both modeling and positioning aspects. The suggested multi-level approach in many cases yields savings in the amount of necessary real-time processing, for instance, but in certain applications where processing and memory constraints are not an issue, also other model structures could be contemplated and used.

In the light of the foregoing, a merely exemplary, pseudo code type presentation of an embodiment of feasible positioning technique in accordance with the present invention is provided next hereinbelow. The code has been created as self-evident as possible with some addition comments embedded (/*) for further clarification.

```
function LocateDevice( ) { /* main function for positioning a mobile device
cell_data = ReceiveCellData( ); /*environment data such as cell data, wlan data, sensor data, etc. is
received from the mobile device
coverage = GetCoverage(cell_data);
/* based on the received data, conditions for initial high-level candidate areas containing the actual
location of the mobile are determined
For (each hierarchy_level) { /* proceed through the vertical multi-level model
For (each wireless_technology) { /*different technologies may have dedicated parameters etc., go
through each technology one by one at first
raw_map =ImportCellDataBase(hierarchy_level, coverage);
/* fetch raw data regarding the relevant portions
statistical_data = ImportStatisticsDataBase(hierarchy_level, coverage);
/*pre-calculated statistics is fetched from the database, e.g. indication of certain cell (relative) visi-
```

```
bility within an area, etc.
wireless_technology_specific_probability_map = CreateProbabilityMap(raw_map, statistical_data ,
cell_data);
/*technology-specific probability maps are established based on gathered data
    }
probability_map = MergeProbabilityMaps(each wireless_technology_specific_probability_map);
/*combine technology-specific maps/data together according to a predefined logic
time_extended_map = MergeHistoricalProbabilityMaps(probability_map);
/*adopt e.g. time/history information and optional supportive information in the map.
/*Transition probabilities may be exploited here to update the probability scores of current location
(estimates); e.g. how likely a first position in a previous map translates
/*into a second position in the current map etc.
/*Supportive information such as data regarding traffic conditions, speed limits, area topology, etc.
/*may be applied here to weight and adjust the probabilities. Data reliability (estimates) are taken
/*into account. If area is generally associated with certain characteristic behaviour (e.g. motorway
/*environment), location probabilities following such behavior (e.g. transition occurring at pace and
/*magnitude in line with a speed limit), are elevated
filter_extended_map = EffectFilterEstimatorOnProbabilityMaps(time_extended_map);
/*estimator such as Kalman may be applied to filter or 'smoothen' the position estimates. Logical
/*continuum in the path of locations may be
/*estimated and different probability paths analyzed. Based on history data e.g. probability of a
/*turn may be estimated and location probabilities of the current position revised
coverage -= DropLocationsNotWithinProbabilityRange(probability map);
/* drop out the least likely sub-areas from future calculations, proceed to the subsequent level
}
location[x, y, z] = FindBestScore(filter_extended_map);
/* location with highest probability or 'location score' is selected as the current position estimate
SendLocationToClient(ConvertToLatLonLevel(location)); /* estimate is provided forward
}
function CreateProbabilityMap(raw_map, statistical data, cell data) {
    for (each sub_area within raw_map) {
        formula = GetFormula(sub_area);
/* fetch models, e.g. signal propagation models, for the concerned area
        for (each map_location within sub_area)
probability_map[map_location] = formula(GetParameters(sub_area));
}
for (each map_location within raw_map) {
        for (each map_location_within_calculation_range) {
            Do (each that is applicable for the technology) {
            match _score = FindBestMatchingCells(cell_data, signal_ranges, statisti-
cal_data) * cell_match_range_effect;
/*based on statistics, determine e.g. the probability, for a given signal strength, of a certain cell's
/*visibility to the concerned location
groups_score = FindMatchingGroups(cell_data) * group_match_range_effect;
/* apply joint knowledge of environment data, e.g. cell data, here. For example, completely arbitrary
/* combinations of visible cells or e.g. handovers between cells are seldom, practically never
/* possible as the possible valid combinations follow the configuration and geographical extent of
/* the spread cell towers/network necessarily, cells and cell visibilities are thus grouped
/* however, with some other technologies such as WiFi/VVLAN the situation is different and cells
/* or coverage areas may be considered in isolation
            technology_score = DoTechnologySpecificProcessing(cell_data) * technol-
ogy_specific_range_effect;
/*apply technology-specific issues; e.g. timing advance is valid data in GSM, not in WiFi
}
    probability_map[map_location] = SynthesizeData(map_location, all_scores);
}
}
}
}
function MergeHistoricalProbabilityMaps(probability_map) {
for (each map_location within probability_map and historical_map) {
    probability_map[map_location] = probability_map[map_location] *
map_location_trustworthiness + FindProbabilityOfHavingMovedHereBasedOnHistorical-
Data(historical_map, time_difference, traffic_rules_speed_limits, error_estimates);
    }
}
function MergeProbabilityMaps( ) {
    for (each map_location) {
        for (each wireless_technology) {
            effective_range = CalculateEffect(location_speed_limits, map-
ping_location_error_estimates, measurement_error_estimates, calculation_error_estimates);
            merged_map[map_location] += GetPossibilities(probability_map, map_location,
effective_range, error_estimates);
}
}
}
}
}
```

Figure 3:
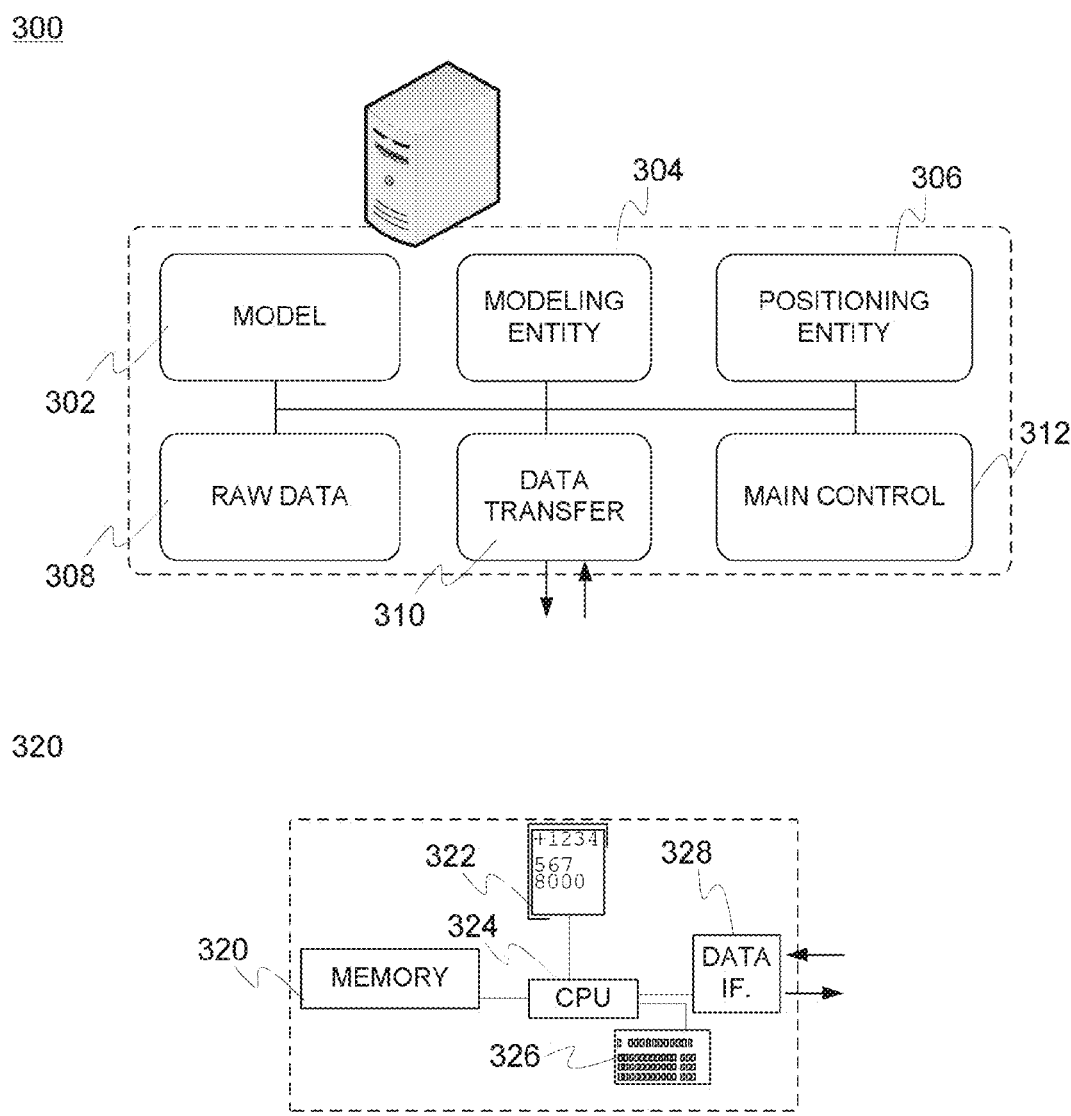
FIG. 3 is a block diagram of an arrangement in accordance with an embodiment of the present invention.

FIG. 3 shows, at 300, a more logical representation of a block diagram of an electronic device or arrangement/system comprising at least one device, optionally a server, in accordance with an embodiment of the present invention.

Raw data 308 may include measurement data obtained from a plurality of mobile devices and/or other sources during modeling the properties of the area of interest. Model 301 may include statistics and other derived data establishing at least part of the multi-level probability map model structure maintained in the context of the present invention for enabling accurate and scalable positioning. Modeling entity 304 may refer to the logic, rules, methodology, etc. applied for establishing and maintaining the model and related data. Positioning entity 306 correspondingly refers to the logic, rules, methodology, etc. applied for positioning a target device based on the environment data obtained, the model 302 and possible other data. Data transfer entity 310 may take care of communication with external entities, such as network infrastructure(s) and entities accessible therethrough. Main control 312 refers to a control entity managing the overall execution of the various, optionally substantially simultaneously, executed processes, channeling of data and attributes/parameters therebetween, responses to queries such as positioning requests, etc.

At 320, more hardware-oriented presentation of the same is shown. At least one processing element 324 such as one or more (micro)processors, micro-controllers, DSP's (digital signal processor), programmable logic chips, etc. may be provided. The element 324 may be configured to execute the computer application code stored in a memory 320, which may imply processing instructions and data relative to a number of application(s) or software modules/entities associated with the present invention for positioning. The memory 320 may be divided between one or more physical memory chips or other memory elements. The memory 320 may further refer to and include other storage media such as a preferably detachable memory card, a floppy disc, a CD-ROM, or a fixed storage medium such as a hard drive. The memory 320 may be non-volatile, e.g. ROM, and/or volatile, e.g. RAM, by nature.

A UI (user interface) may be provided and comprise a display 322, and/or a connector to an external display or a data projector, and keyboard/keypad 326 or other applicable local control input means (e.g. a touch screen or voice control input, or separate keys/buttons/knobs) configured so as to provide the user of the arrangement/device with practicable data visualization and device control means. The UI may further include one or more loudspeakers and associated circuitry for sound output. Yet, a remote UI functionality may be implemented by means of a web server and web site operated thereat, for example. For the purpose, data transfer interface(s) 328 may be utilized. Alternatively, different APIs (application programming interface) may be provided to access and use the elements of the present invention.

A data transfer interface 328 including e.g. a wired network interface such as LAN (Local Area Network, e.g. Ethernet) interface or a wireless network interface, e.g. WLAN (Wireless LAN) may be provided. Terminal devices may include a wireless cellular interface, e.g. GSM (Global System for Mobile Communications), UMTS (Universal Mobile Telecommunications System), and/or 4G/LTE compliant one, and e.g. the aforesaid WLAN interface. Yet, GNSS or regional positioning system receiver such as GPS or GLONASS receiver may be provided.

Reverting to the foregoing logical, thus at least partially software realizable, functionalities for instructing the underlying hardware to carry out the various procedures suggested herein may be implemented as one or more software applications executed by the processor. This computer software (product) may be thus provided on a non-transitory carrier medium such as a memory card, a memory stick, an optical disc (e.g. CD-ROM, DVD, Blu-ray™), or some other memory carrier.

In some embodiments, the arrangement or system of the present invention is realized by a number of network-connected server devices as mentioned hereinbefore. The servers may establish a remote service whereto the mobile devices submit data and wherefrom they receive location estimates. Optionally, at least some actions considered as integral part of the arrangement of the present invention are executed already at the mobile device to be positioned by client software, in which case the arrangement/system can be deemed to also contain the particular mobile device.

In a further embodiment, a mobile-based implementation is exploited as hinted hereinbefore. At least static copy of the multi-level model, or relevant (e.g. geographically limited) part thereof and the necessary positioning logic may be deployed at the mobile device. A suitable form of computer software, e.g. a positioning client application or a local instance of a positioning server, may be downloaded thereto to enable e.g. stand-alone positioning feature not requiring, at least continuously, the usage of or active connection to a number of remote service(s) or server(s).

Figure 4:
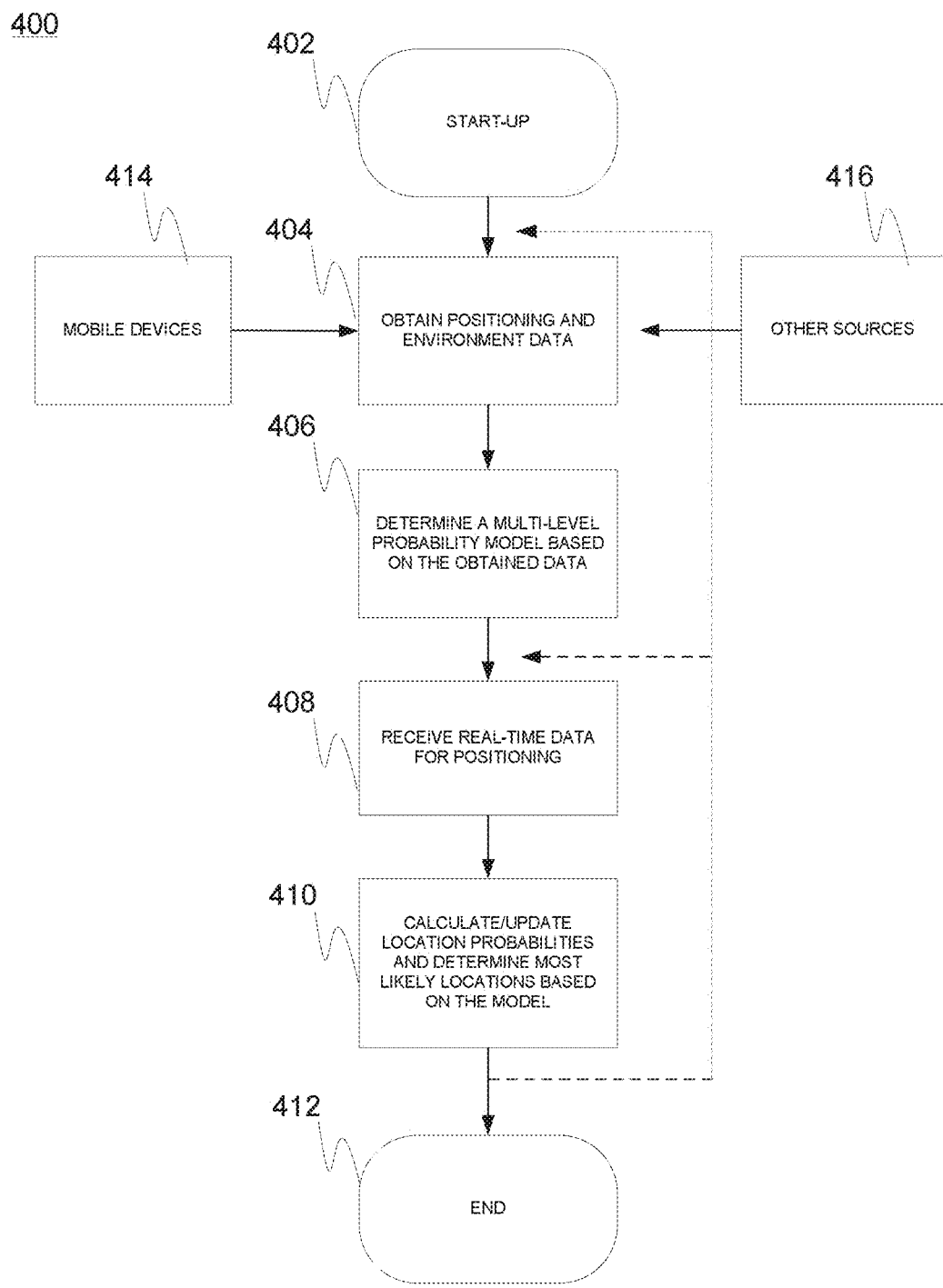
FIG. 4 is a flow diagram disclosing an embodiment of a method in accordance with the present invention.

FIG. 4 depicts, at 400, a flow diagram disclosing an embodiment of a method in accordance with the present invention. At 402, indicative of start-up phase, various preparatory actions may be executed. For instance, different hardware elements and related software, such as positioning servers, mobile clients, etc. may be ramped up and configured.

Item 404 refers generally to modeling or 'mapping' activities, which incorporate obtaining positioning data, such as satellite positioning data, and environment data, such as cellular network based data, from a plurality of measuring mobile devices 414 present in an area of interest. The mobile devices may be provided with dedicated data collection and reporting logic, e.g. in the form of tailored software, for the purpose. Yet, various data may be obtained from a number of other sources 416 with reference to e.g. network elements/operators, officials, external information service providers, etc.

At 406, the execution moves into establishing, based on the obtained data, a multilevel probability map model structure for the area of interest as contemplated hereinbefore.

Item 408 refers to obtaining relevant real-time or near real-time (generally as real-time as possible) data including environment data, preferably cell data and/or wireless local area network related data, for positioning the target device.

Item 410 refers to generating a location estimate of the device by traversing through at least part of the multi-level model in the light of the obtained data.

In particular, a plurality of vertical candidate paths of the multi-level probability map model structure may be followed starting from a number of candidate sub-areas in the highest level, the candidate sub-areas being selected and paths continued or terminated on each level based on determining the probability of the mobile device residing in each sub-area in view of the obtained environment data and optional positioning data and characteristics of the sub-area, until the lowest level with highest spatial resolution is reached, wherein the position estimate of the mobile device is determined based on the highest probability location elements thereof according to predefined criteria.

Nevertheless, it shall be realized here by a person skilled in the art that e.g. during a substantially continuous positioning task such as a typical navigation type use scenario, the model structure may not have to be traversed from the top to the bottom, i.e. from the top level to the lowest level, for each location update. Instead, sub-area(s) of a certain intermediate or even the lowest level, selected during previous positioning round(s), may be applied as a starting point for determining an updated location estimate according to predefined logic.

Typically, when a positioning task is executed substantially continuously with a short period in between the subsequent location estimates, history information such as data captured earlier and related location estimates and selected-sub-areas of the model are still applicable starting points, at least on a coarse level having regard to the actual upper levels of the multi-level model structure, for determining the updated new location estimate. New environment data may be utilized together with the historical data to determine a proper level and/or sub-areas for the current positioning round. Accordingly, processing resources may be spared and processing delay reduced by omitting unnecessary recursions to the top of the model structure upon each positioning round. The application of the model could thus be directly continued from a lower level thereof.

At 412, the method execution is ended. The dotted loopback arrow depicts the potentially and likely repetitive nature of the various disclosed method items. A skilled person will appreciate the fact the also the model and related statistics may still be updated alongside with the positioning actions.

Ultimately, a skilled person may, on the basis of this disclosure and general knowledge, apply the provided teachings in order to implement the scope of the present invention as defined by the appended claims in each particular use case with necessary modifications, deletions, and additions, if any.

Regarding the applicable dimensionality of modeling and positioning in connection with the present invention, preferably at least two dimensions are taken into account. Coordinates such as geographic coordinates (e.g. latitude, longitude) or Cartesian coordinates may be used to indicate position therein. Optionally three-dimensional positioning may be implemented with elevation type vertical data. The mapping data may be collected relative to a plurality of vertical layers or levels, or the unit used to indicate vertical data may be any preferred one, e.g. centimeter or meter.

The invention claimed is:

1. An electronic arrangement for positioning a mobile device, comprising
a modeling entity configured to, in order to construct a database for locating mobile devices,
obtain positioning data and environment data from a plurality of measuring mobile devices present in an area of interest, and establish and maintain, based on the obtained data, a multi-level probability map model structure for the area of interest, wherein each higher level covers the area of interest with lower spatial resolution by a plurality of determined sub-areas, each sub-area having a unitary character in terms of the obtained data and/or features derived therefrom, and each lower level correspondingly covers, for each said sub-area of the adjacent upper level, a plurality of determined sub-areas thereof with higher spatial resolution, the lowest level determining the highest spatial resolution location elements of the model, optionally coordinates, and
a locating entity configured to, in order to locate a mobile device,
obtain at least environment data and optionally positioning data provided by the mobile device, and
determine an estimate of the position of the mobile device by traversing through at least a portion of a number of vertical candidate paths of the multi-level probability model structure starting from a number of candidate sub-areas in the highest level, the candidate sub-areas being selected and paths continued or terminated on each level based on determining the probability of the mobile device residing in each sub-area in view of the obtained environment data and optional positioning data and characteristics of the sub-area, until the lowest level with highest spatial resolution is reached, wherein the position estimate of the mobile device is determined based on the highest probability location elements thereof according to predefined criteria.

2. The arrangement of claim 1, wherein the positioning data includes satellite positioning data and environment data includes cellular network based data.

3. The arrangement of claim 1, wherein the positioning data includes satellite positioning data according to at least one system selected from the group consisting of: GPS (Global Positioning System), GLONASS (Global Navigation Satellite System), BDS (BeiDou Satellite Navigation System), and COMPASS (BeiDou-2).

4. The arrangement of claim 1, wherein environment data comprises at least one data element selected from the group consisting of: cellular network data element, wireless LAN (local area network) data element, MCC (mobile country code) identifier, MNC (mobile network code) identifier, primary scrambling code, ARFCN (absolute radio-frequency channel number), BSIC (base station identity code), received signal strength, radio frequency, LAC (location area code), TAC (tracking area code), CID (Cell ID), PCI (Physical Cell ID), MAC (media access control address), SSID (service set identifier), RSSI (received signal strength indication), RSCP (received signal code power), and RSRP (reference signal received power).

5. The arrangement of claim 1, configured to group multiple data elements for establishing a characteristic for modelling and positioning.

6. The arrangement of claim 1, configured to group multiple data elements for establishing a characteristic for modelling and positioning, wherein multiple cellular data elements are grouped, preferably including indication of current serving cell and neighbouring cells.

7. The arrangement of claim 1, wherein a location-related probability is determined utilizing the probabilities of adjacent locations according to predefined logic.

8. The arrangement of claim 1, wherein a plurality of technology-specific, spatially overlapping probability maps are established with a number of technology-specific characteristics, and combined during positioning according to a predefined merging logic.

9. The arrangement of claim 1, wherein the probability map model structure incorporates or is established by a number of predefined statistics, such as cell visibility statistics, for use during positioning.

10. The arrangement of claim 1, wherein a bounding box technique is applied to determine a geographical sub-area or blank area within scope of the probability map model structure, wherein the bounding box is delimited by data points obtained by the modelling entity from mobile devices.

11. The arrangement of claim 1, wherein at least two co-existing geographically overlapping models are at least temporarily maintained for an area, optionally a sub-area of the model structure.

12. The arrangement of claim 1, wherein at least two co-existing geographically overlapping models are at least temporarily maintained for an area, optionally a sub-area of the model structure, and wherein responsive to detecting a change large enough in the obtained data relative to previous data regarding the area according to a utilized criterion, a new model is established alongside with a previous model.

13. The arrangement of claim 1, wherein at least two co-existing geographically overlapping models are at least temporarily maintained for an area, optionally a sub-area of the model structure, and wherein responsive to detecting a change large enough in the obtained data relative to previous data regarding the area, a new model is established alongside with a previous model, and wherein a new model or previous model is discarded as obsolete in favour of the remaining model after a period of co-existence according to decision-making criterion optionally putting emphasis on the more recent data.

14. The arrangement of claim 1, wherein the model structure is time-sensitive.

15. The arrangement of claim 1, wherein determining a current position estimate of the mobile device comprises merging probability data of different time instants.

16. The arrangement of claim 1, wherein movement estimation is applied to estimate the probability of a number of paths or transitions between possible locations of the mobile device.

17. The arrangement of claim 1, wherein road map data, road plan data or other data indicative of the road characteristics in the area is applied for determining likely, minimum, or maximum expected transition per selected time window or speed within the area.

18. The arrangement of claim 1, wherein estimation technique, preferably Kalman filter, is utilized to determine like path of movement of the mobile device based on the model and obtained environment data.

19. The arrangement of claim 1, wherein the locating entity is configured to apply data, obtained during positioning a second mobile device from the second mobile device, to position the mobile device.

20. The arrangement of claim 1, wherein offset compensation is applied to level out differences between positioning or environment data measured by multiple mobiles devices, caused by different data receipt or processing capabilities of the devices.

21. The arrangement of claim 1, configured to receive, from the mobile device, at least one further data element selected from the group consisting of: sensor data, accelerometer data, temperature data, humidity data, context data, digital image data, video data, sound data, and time data.

22. The arrangement of claim 1, configured to obtain supportive modelling or positioning data relative to the area of interest, optionally sub-area, including at least one data element selected from the group consisting of: area topology data, speed limit data, traffic status data, area geographical data, city plan data, artificial object data, building data, natural object data, lake data, river data, sea data, boulder data, traffic light data, road data, sidewalk data, and cycleway data.

23. The arrangement of claim 1, configured to associate data from different sources, optionally including professional entities and crowdsourcing, with source-dependent reliability estimates to enable giving data from different sources a different weight in modelling and positioning.

24. The arrangement of claim 1, wherein during a repetitive or substantially continuous positioning, optionally navigation, procedure, a subsequent new position estimate is determined through utilization of the multi-level probability model structure starting from a number of candidate sub-areas in an intermediate or lowest level thereof, based on the history data relating to a number of previous positioning rounds, optionally a previously selected sub-area and/or a previously determined position estimate.

25. A method for positioning a mobile device operable in at least one wireless communications network, comprising obtaining positioning data, optionally including satellite positioning data, and environment data, optionally including cellular network based data, from a plurality of measuring mobile devices present in an area of interest, establishing, based on the obtained data, a multi-level probability map model structure for the area of interest, wherein each higher level covers the area of interest with lower spatial resolution by a plurality of determined sub-areas, each sub-area having a unitary character in terms of the obtained data and/or features derived therefrom, and each lower level correspondingly covers, for each said sub-area of the adjacent upper level, a plurality of determined sub-areas thereof with higher spatial resolution, the lowest level determining the highest spatial resolution location elements of the model, optionally coordinates, and generating a location estimate of the mobile device, wherein at least environment data and optionally positioning data are provided by the mobile device and an estimate of the position of the mobile device is determined by traversing through at least a portion of a number of vertical candidate paths of the multi-level probability map model structure starting from a number of candidate sub-areas in the highest level, the candidate sub-areas being selected and paths continued or terminated on each level based on determining the probability of the mobile device residing in each sub-area in view of the obtained environment data and optional positioning data and characteristics of the sub-area, until the lowest level with highest spatial resolution is reached, wherein the position estimate of the mobile device is determined based on the highest probability location elements thereof according to predefined criteria.

26. A mobile electronic device operable in at least one wireless communications network, configured to obtain a multi-level probability map model structure for an area of interest, wherein each higher level covers the area of interest with lower spatial resolution by a plurality of determined sub-areas, each sub-area having a unitary character in terms of the obtained data and/or features derived therefrom, and each lower level correspondingly covers, for each said sub-area of the adjacent upper level, a plurality of determined sub-areas thereof with higher spatial resolution, the lowest level determining the highest spatial resolution location elements of the model, optionally coordinates, the model structure being established based on positioning data and environment data from a plurality of measuring mobile devices present in the area of interest, obtain environment data based on a number of captured wireless network signals, and estimate its position through utilization of the model structure, wherein the position is determined by traversing through at least a portion of a number of vertical candidate paths of the multi-level probability map model structure starting from a number of candidate sub-areas in the highest level, the candidate sub-areas being selected and paths continued or terminated on each level based on determining the probability of the mobile device residing in each sub-area in view of the obtained environment data and characteristics of the sub-area, until the lowest level with highest spatial resolution is reached, wherein the position estimate of the mobile device is determined based on the highest probability location elements thereof according to predefined criteria.

27. A computer program product embodied in a non-transitory carrier medium, comprising instructions causing the computer to,
  obtain positioning data, optionally satellite positioning data, and environment data, optionally cellular network based data, from a plurality of measuring mobile devices present in an area of interest,
  establish, based on the obtained data, a multi-level probability map model structure for the area of interest, wherein each higher level covers the area of interest with lower spatial resolution by a plurality of determined sub-areas, each sub-area having a unitary character in terms of the obtained data and/or features derived therefrom, and each lower level correspondingly covers, for each said sub-area of the adjacent upper level, a plurality of determined sub-areas thereof with higher spatial resolution, the lowest level determining the highest spatial resolution location elements of the model, optionally coordinates, and
  generate a location estimate of the mobile device, wherein at least environment data and optionally positioning data are provided by the mobile device and an estimate of the position of the mobile device is determined by traversing through at least a portion of a number of vertical candidate paths of the multi-level probability map model structure starting from a number of candidate sub-areas in the highest level, the candidate sub-areas being selected and paths continued or terminated on each level based on determining the probability of the mobile device residing in each sub-area in view of the obtained environment data and optional positioning data and characteristics of the sub-area, until the lowest level with highest spatial resolution is reached, wherein the position estimate of the mobile device is determined based on the highest probability location elements thereof according to predefined criteria.

* * * * *